US009163936B1

(12) United States Patent
Ulmer et al.

(10) Patent No.: US 9,163,936 B1
(45) Date of Patent: Oct. 20, 2015

(54) THREE-DIMENSIONAL PROFILOMETER (71) Applicant: Physical Optics Corporation, Torrance, CA (US)

(72) Inventors: Christopher Thad Ulmer, San Pedro, CA (US); Paul Shnitser, Irvine, CA (US); David Harold Miller, San Pedro, CA (US); Edward Matthew Patton, Torrance, CA (US); Paul Wilkinson, San Pedro, CA (US)

(73) Assignee: Physical Optics Corporation, Torrance, CA (US)

( * ) Notice: Subject to any disclaimer, the term of this patent is extended or adjusted under 35 U.S.C. 154(b) by 0 days.

(21) Appl. No.: 13/889,203

(22) Filed: May 7, 2013

Related U.S. Application Data (60) Provisional application No. 61/643,796, filed on May 7, 2012, provisional application No. 61/664,616, filed on Jun. 26, 2012, provisional application No. 61/702,130, filed on Sep. 17, 2012.

(51) Int. Cl.
*G01B 11/24* (2006.01)

(52) U.S. Cl.
CPC ..................................... *G01B 11/24* (2013.01)

(58) Field of Classification Search
CPC ............... G01B 11/24; G01B 11/2518; G01B 11/2509; G01B 11/026; G01B 21/20; G06T 17/00; A61B 5/1077
USPC ................ 356/601–613, 3.09, 4.01, 5.01, 5.1
See application file for complete search history.

(56) References Cited

U.S. PATENT DOCUMENTS

| | | | | |
|---|---|---|---|---|
| 4,788,441 A * | 11/1988 | Laskowski | ............... | 250/559.38 |
| 4,794,262 A * | 12/1988 | Sato et al. | ................ | 250/559.22 |
| 4,900,144 A * | 2/1990 | Kobayashi | .................... | 351/206 |
| 5,416,591 A * | 5/1995 | Yoshimura et al. | ........... | 356/608 |
| 6,392,754 B1 * | 5/2002 | Pingel et al. | .................... | 356/603 |
| 6,441,908 B1 * | 8/2002 | Johnston et al. | .............. | 356/602 |
| 7,787,179 B2 * | 8/2010 | Lippert et al. | ................ | 359/385 |
| 8,738,304 B2 * | 5/2014 | Hall et al. | ........................ | 702/34 |
| 2004/0151345 A1 * | 8/2004 | Morcom | ........................ | 382/104 |
| 2004/0190005 A1 * | 9/2004 | Doucet et al. | ................. | 356/614 |
| 2008/0088856 A1 * | 4/2008 | Nishio | .......................... | 356/623 |
| 2012/0044504 A1 * | 2/2012 | Ohnishi et al. | ................ | 356/602 |
| 2012/0246899 A1 * | 10/2012 | Yamada et al. | ............ | 29/407.04 |
| 2013/0070257 A1 * | 3/2013 | Wong | ............................ | 356/601 |

* cited by examiner

*Primary Examiner* — Hoa Pham
(74) *Attorney, Agent, or Firm* — Sheppard Mullin Richter & Hampton LLP (57) ABSTRACT

Profilometers for industrial metrology and other applications are described. A line is projected on a surface to be profiled. The line is scanned to build a three dimensional point cloud allowing the three-dimensional (3D) profile of the surface to be determined. In some embodiments, the line is projected by a laser system. In other embodiments, the line is projected by a digital micromirror device (DMD). In still further embodiments, multiple lines, or other patterns are projected.

20 Claims, 6 Drawing Sheets

THREE-DIMENSIONAL PROFILOMETER

CROSS-REFERENCE TO RELATED APPLICATIONS

This application claims the benefit of: U.S. Provisional Application No. 61/643,796, filed May 7, 2012; U.S. Provisional Application No. 61/664,616, filed Jun. 26, 2012; and U.S. Provisional Application No. 61/702,130, filed Sep. 17, 2012, and which are hereby incorporated herein by reference in their entireties.

STATEMENT OF RIGHTS TO INVENTIONS MADE UNDER FEDERALLY SPONSORED RESEARCH

This invention was made with Government support under Contract No. FA8650-11-M-5196 awarded by the Air Force Research Laboratory. The Government has certain rights in the invention.

TECHNICAL FIELD

The disclosed technology relates generally to industrial metrology, and more particularly, some embodiments relate to systems and methods for scanning three-dimensional (3D) profilometry.

DESCRIPTION OF THE RELATED ART

In the general area of industrial metrology, ouch probes are used in precision milling or drilling machines (PMMs), coordinate measurement machines (CMMs), or by hand in a metrology fixture to measure features of a machined part where the measured features must meet critical design tolerances. Modern manufacturing methods require that certain key features or characteristics of a part are held to very tight tolerances so that when those parts are assembled with other manufactured parts, all of the parts of the assembly fit together correctly. Currently, for large parts where the key features are at some distance from each other, the part is kept in the large scale PMM, commonly known as Computer Numerically Controlled (CNC machines), while the spindle of the machine picks up a touch probe that is used to make confirmation measurements that the part has been machined to within the required tolerances. This process is time consuming because the touch probe needs to touch several spots on each feature to record the precise location and key characteristics of each machined feature, requiring the CNC machine head to be driven precisely to each location for each touch on the part.

BRIEF SUMMARY OF EMBODIMENTS

Various embodiments of the disclosed technology provide profilometers for industrial metrology and other applications. A line is projected on a surface to be profiled. The line is scanned to build a three dimensional point cloud allowing the three-dimensional (3D) profile of the surface to be determined. In some embodiments, the line is projected by a laser system. In other embodiments, the line is projected by a digital micromirror device (DMD). In still further embodiments, multiple lines, or other patterns are projected.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

Figure 1:
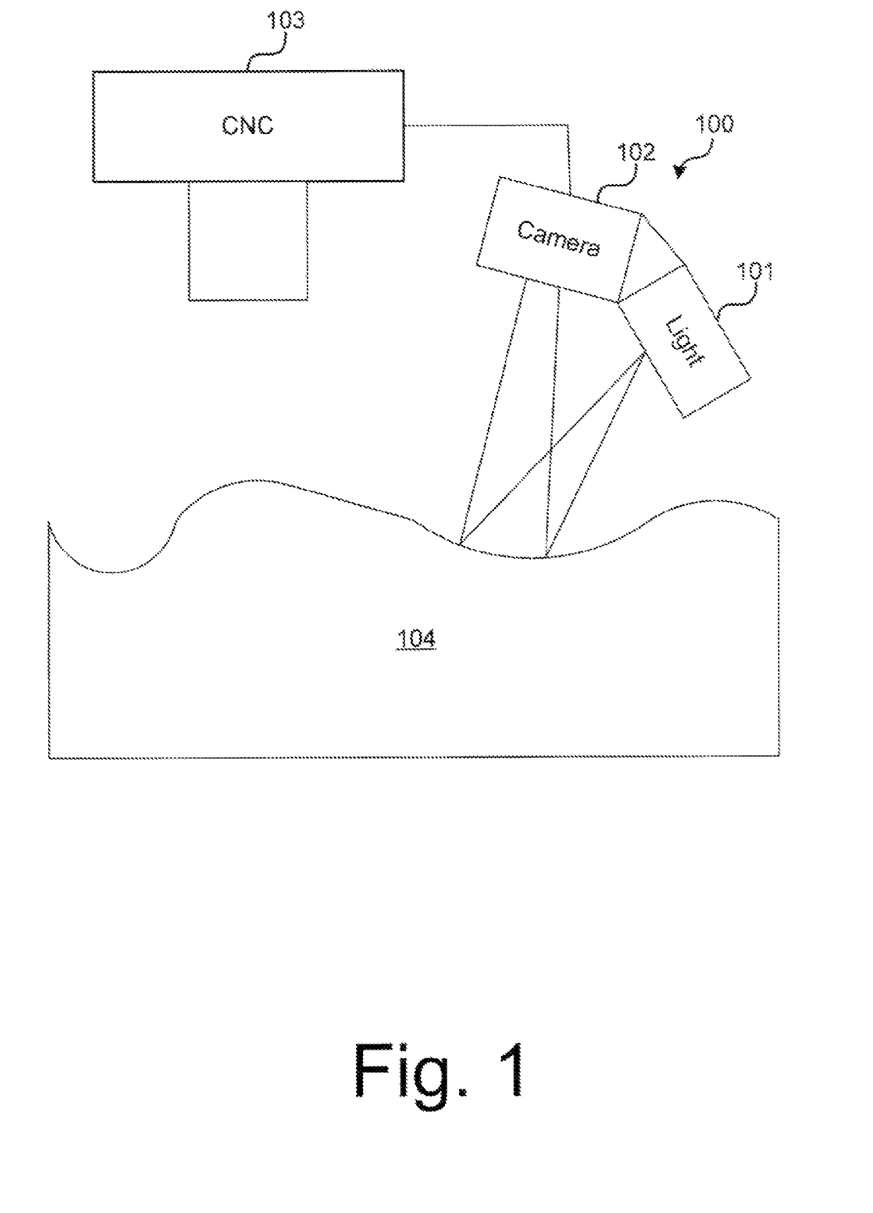
FIG. 1 illustrates a line scanning 3D profilometer in accordance with one embodiment of the technology described herein.

FIG. 1 illustrates an example environment in which some embodiments may be implemented. In this environment a profilometer 100 is coupled to a CNC machine 103, such as a precision milling machine (PMM) or coordinate measurement machine (CMM). For example, the profilometer 100 may be coupled to a spindle of the CNC machine 103, a robotic arm attached to the CNC machine 103, or through some other coupling mechanism. However, in other embodiments, the profilometer may be handheld or otherwise monitored. The profilometer scans a machined feature 104 produced by the CNC 103.

Figure 2:
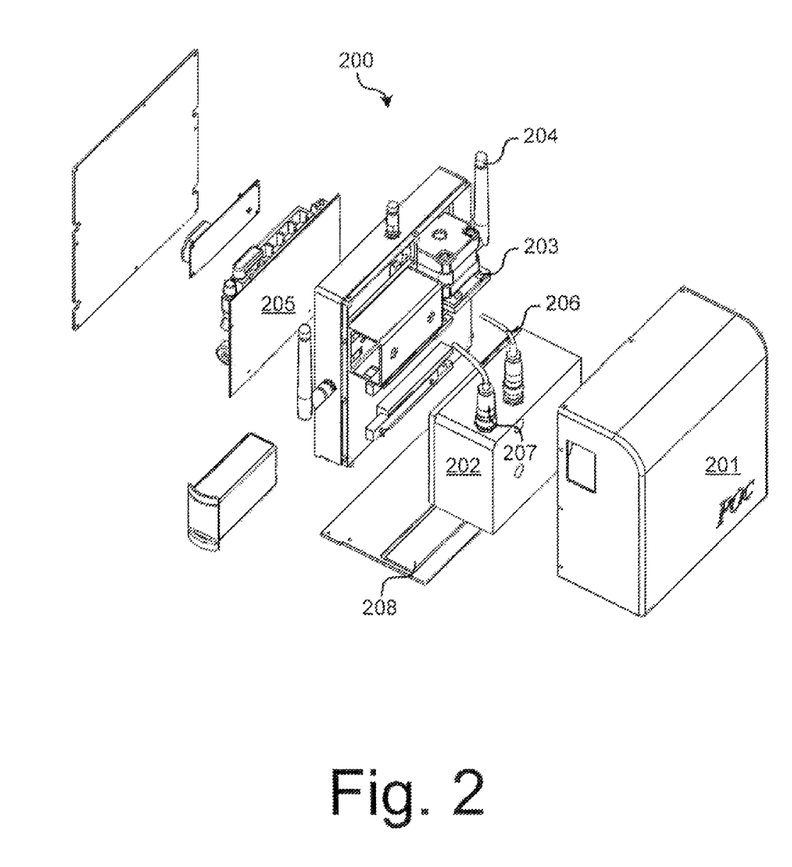
FIG. 2 illustrates a line scanning 3D profilometer in accordance with a second embodiment of the technology described herein.

FIG. 2 illustrates an embodiment of a scanning laser line profilometer. The profilometer 200 comprises a housing 201. The housing 201 houses a commercial, off-the-shelf (COTS) two dimensional (2D) laser line scanner 202. The COTS 2D laser line scanner 202 is coupled to an actuator 203, configured to scan the 2D scanner 202 in the direction perpendicular to the 2D scanner's 202 laser line. In the illustrated embodiment, the actuator 203 comprises a stepper motor and linear stage.

The housing 201 further houses an electronics subsystem 205 coupled to the actuator 203 and the 2D scanner 202. The electronics subsystem 205 controls the actuator 203 to control the position of the 2D scanner 202. The electronics system 205 further maintains a record of the position of the 2D scanner 202 during operation. For example, the electronics subsystem 205 may comprise a linear encoder used to determine the position of the state at all times. The electronics subsystem 205 is coupled to the input 206 and output 207 of the 2D scanner 202 to control the scanner's operations and to obtain the scanner output.

During operation, the electronics 205 moves the laser scanner along a predictable path in a predictable way to maintain a record of metrology data by scanner 202 position. Additionally, the electronics 205 controls the frame rate of the camera in scanner 202. Each frame records a 2D profile (typically in the form of a 2D point cloud) along the laser line emitted by scanner 202 through a window 208 in the housing 201. The electronics 205 combines multiple frame outputs to develop a 3D profile (for example, in the form of a 3D point cloud).

Profilometer 200 further comprises one or more communication port 204, such as antennas, USB ports, or Ethernet ports, coupled to the electronics 205. The ports 204 allow the system 200 to be remotely controlled—for example, wirelessly controlled. Additionally, the ports 204 may be used to transmit data to a computer. At the computer, the wireless data may be recorded, stored, and processed for extraction of the key characteristic measurements of each machined feature.

If the device 200 is handheld, the data may be stored on the device for each machined feature measured. The device 200 may further comprises an input allowing a user to indicate which feature is being measured. This allows the user to make the measurement and then move to the next feature to be measured.

Additionally, the device 200 may comprise an output, such as a display, the output may display the required measurement of the key characteristics of the machined feature.

The electronics 205 may further comprise on-board processing and feature recognition software. Such software may automatically recognize the feature just measured, allowing the device 200 to report or return the appropriate measurements of that feature. The device 200 may report the measurements using the communication port(s) 204 or the display.

Figure 3:
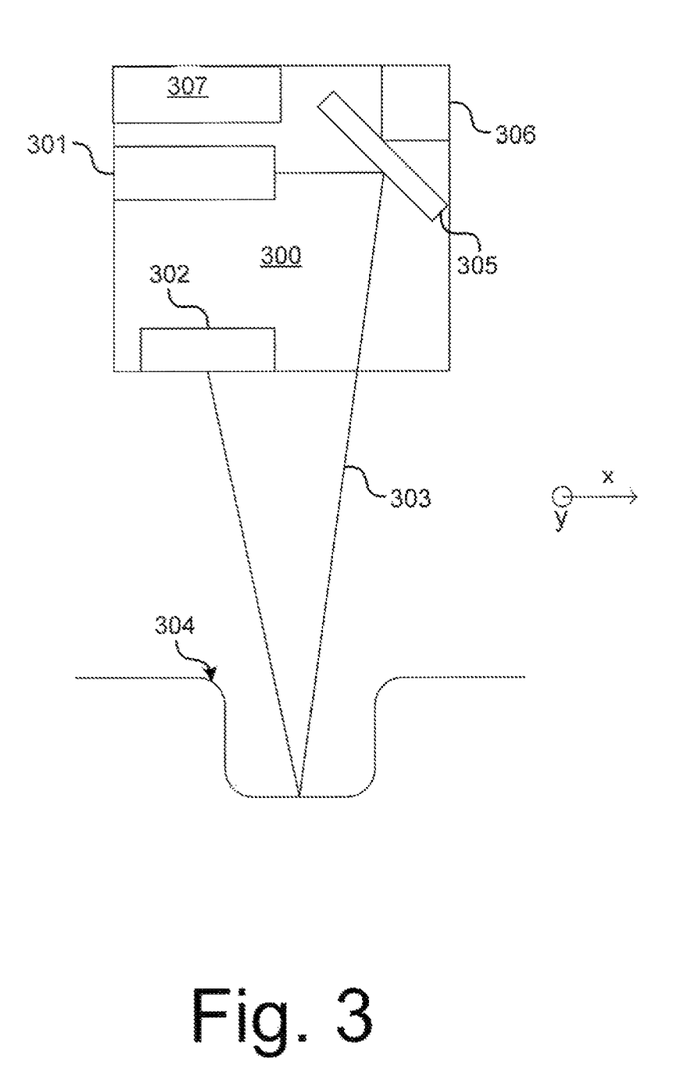
FIG. 3 illustrates a line scanning 3D profilometer in accordance with a third embodiment of the technology described herein.

FIG. 3 illustrates another embodiment of a 3D laser line scanner. In this embodiment, the scanner 300 comprises a laser line emitter 301. The laser line emitter emits a laser line 303 (where the line is in the y direction). The laser line 303 is redirected by a mirror or prism 305 towards a feature 304. The line 303 reflects off the feature 304 and is imaged by a camera 302. Actuator 306, such as a galvanometer or rotation stage, controls the angle of the mirror or prism 305. Electronics subsystem 307 controls the actuator 306 to move the line 303 location by changing the angle of the mirror or prism 305.

Like the embodiment of FIG. 2, the scanner 300 may comprise data ports to allow for remote control and reporting. The scanner 300 may also comprise I/O systems, such as keypads or displays for local control and reporting.

Figure 4:
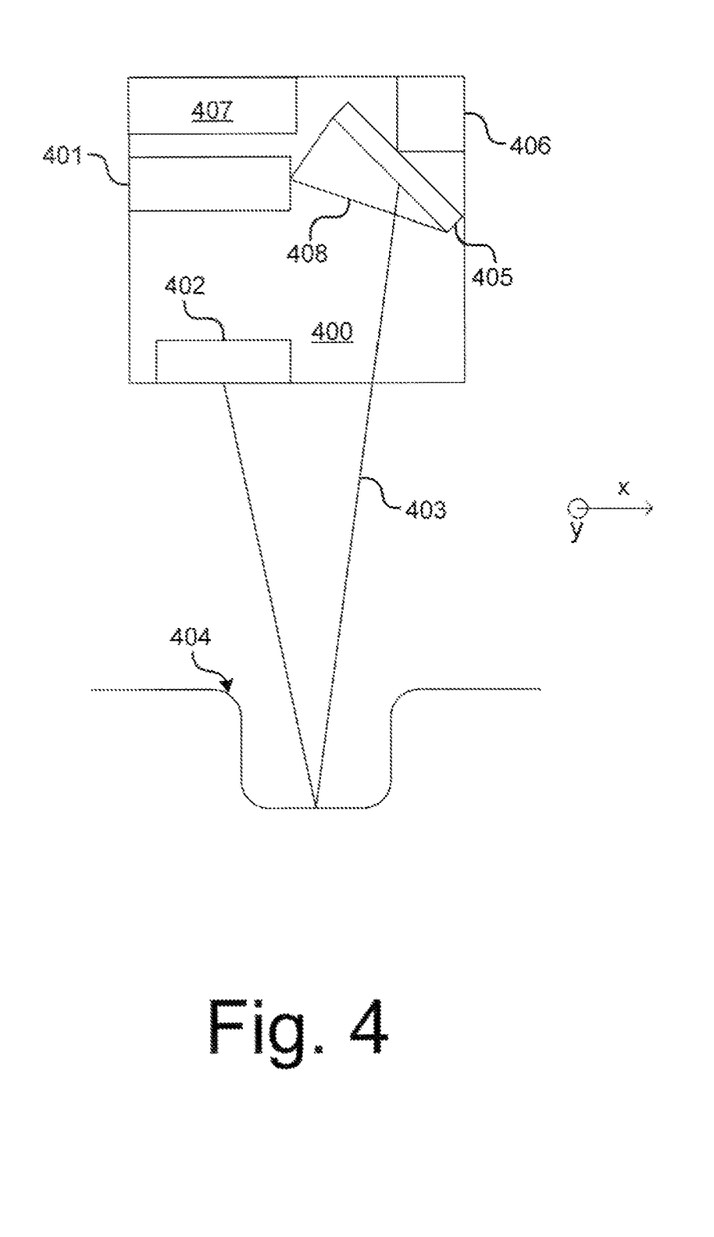
FIG. 4 illustrates a line scanning 3D profilometer in accordance with a fourth embodiment of the technology described herein.

FIG. 4 illustrates an embodiment of a profilometer utilizing a digital micromirror device (DMD). In this embodiment, profilometer 400 comprises a light source 401, a camera 402, a DMD 405, and control electronics 407. The light source 401 emits a beam (such as a collimated beam) 408 that illuminates the entire surface of DMD 405. The control electronics 407 controls which micromirrors of DMD 405 are directed towards the feature to be measured 404. Accordingly, the control electronics 407 may control the shape and location of emitted beam 403. For example, the beam 403 may comprise a line, a pattern of lines, a cross, or other metrology pattern. The beam 403 may be monochrome or broadband.

Camera 402 images the reflected beam 403 to determine the profile of the feature 404. The camera's 402 data is output to the control electronics 407 or an external processor for profiling.

In some embodiments, the beam 403 is configured to allow the control electronics 407 to determine a 3D profile from a single frame. For example, the beam 403 may project a 2D spatially varying intensity pattern to allow the control electronics 407 to perform any of the structured-light 3D surface imaging technique known in the art.

In other embodiments, the beam 403 is configured to allow multiple 2D profiles to obtained from a single frame. For example, the beam 403 may comprise a monochrome cross of two lines in two different directions. As another example, the beam 403 may comprise a plurality of monochrome lines, separated by sufficient distance to allow the reflections from each line to be distinguished by control electronics 407. As a further example, the beam 403 may comprise a plurality of differently colored lines, where color tagging may be used by the control electronics 407 to distinguish the reflections from the differently colored lines.

In further embodiments, the system 400 may comprise an actuator 406 coupled to the DMD 405. The actuator 406 may be controlled by control electronics 407 to translate or rotate the DMD 405. System 400 may include an actuator 406 when control of the active micromirrors of DMD 405 is insufficient to scan a sufficiently large area.

In some embodiments, the system 400 has a plurality of different operating modes. For example, the plurality of operating modes may comprise a plurality of different line directions, a plurality of different line shapes, or a plurality of any of the patterns discussed herein. A user may choose between the different operating modes (for example, using the communications port, or I/O), or the system may be pre-programmed to use certain modes for measuring certain features. For example, a system 400 may have a greater point cloud density in the direction aligned with a beam 403 line. Accordingly, the beam line 403 may be aligned in a more critical feature direction, and scanned in a less critical feature direction.

Figure 5:
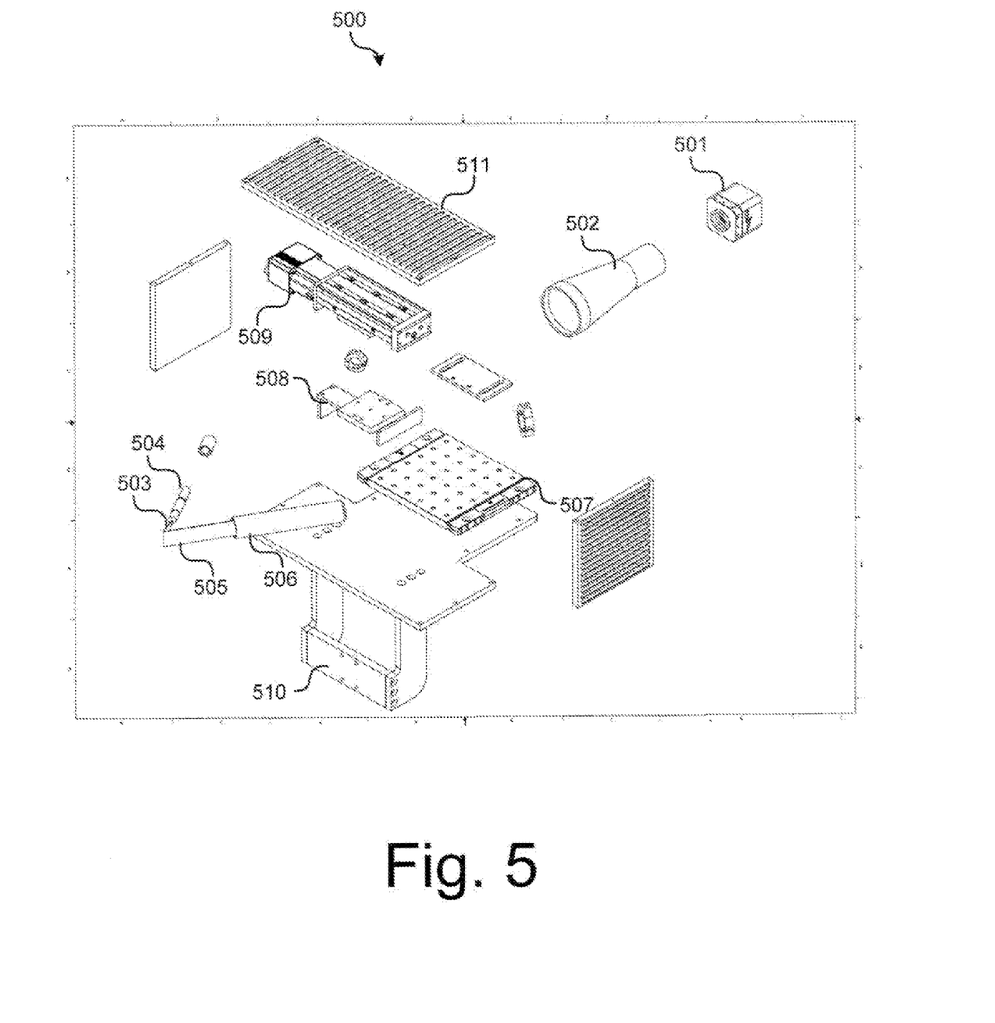
FIG. 5 illustrates a line scanning 3D profilometer in accordance with a fifth embodiment of the technology described herein.

FIG. 5 illustrates a line scanning profilometer for ophthalmologic or ophthalmoscopic applications. Such embodiments may be used to provide scleral lens or ocular surface prosthetic device fitters with a means to measure the ocular surface topography with the intent to use the measurements either for a custom lens design or for determining the optimal starting lens from an existing lens fitting kit. The scanning system 500 comprises a camera 501, an actuator 509, and light sources 504, 506.

Light source 504 emits a beam 503 at a wavelength imaged by camera 501. Light source 506 emits a beam 505 at a different wavelength than that imaged by camera 501. If utilized, beam 505 is used to fluoresce a substance deposited in the patient's eye. In some embodiments, only one light source 504 or 506 is present in the system 500.

The light sources 504, 505 are coupled to an actuator 509, such as a stepper motor and linear stage. Like the embodiment of FIG. 2, control electronics use the stepper motor and linear state go precisely move the light sources 504, 505 and to know their location at all times. In this embodiment, the actuator 509 is coupled to the housing 511 using a mounting bracket 508.

The camera 501 and lens 502 are coupled to the housing 511 using a camera mounting stage 507 having conventional positioning and locking elements. The camera 501 is positioned such that the entire eye surface is imaged on the camera sensor. The stationary camera 501 may allow the system to use the camera to register the eye position and to take it into account during the calculation of the 3D ocular surface map. The stationary camera 501 may also allow the system 500 to register topographic data to the image of the eye surface.

The laser lines 503, 505 are scanned across the ocular surface. Each frame of the camera 501 provides a 2D profile of the eye. Multiple frames are assembled, after taking into account any eye movement, to provide a 3D profile of the eye.

Embodiments can be used independently or can be a part of a corneal topography measurement device. In such geometry the laser scanning device will measure the shape of the sclera, while the corneal shape measurement device will provide the corneal measurement. The interface between the cornea and the sclera can be measured using either by both of two devices, and by only one of the two.

Some embodiments may have more than one laser line projected on the eye surface in such fashion that while scanning across the ocular surface the profile of several lines is simultaneously recorded and the three-dimensional shape is determined from the combination of these measurements.

Further embodiments can have an illumination unit other than a laser line generator. The device can operate with any light source, provided that it is focused into a line or into a combination of several lines which illuminate the ocular surface and are scanned across.

Embodiments can also be used in fluorescence imaging mode, where the wavelength of the light source is different from the wavelength detected by the camera, for instance by using an edge or bandpass optical filter between the ocular surface and the camera sensor. In such device a drop of fluorescent substance, such as fluorescein, will be put on the eye surface. The illumination source will excite the fluorescence in the fluorescing substance spread over the ocular surface, and the camera will be used to record the line shape generated by the fluorescence.

Embodiments can also be used to verify the fit of the scleral lens or the ocular surface prosthetic device by performing the measurement of the eye with the lens in place and imaging the lines that can be seen on the lens surfaces and ocular surfaces. The fit of the scleral lens or ocular surface prosthetic device can also be verified in fluorescence imaging by placing a drop of fluorescent substance between the ocular surface and the lens and using the fluorescent imaging for determining the thickness and the shape of the liquid contained between the ocular surface and the lens.

Embodiments can operate in a very rapid fashion to perform the measurement of the entire eye between the microsaccadic eye movements, or it can use ocular imaging from the device camera or an auxiliary camera to register the eye movements and register the measured 2D profiles to the ocular topography. An additional light source can be used to illuminate the eye continuously or in a flash or strobe mode to allow the camera to record the eye position.

In some embodiments, the system 500 uses a leading edge laser line detection algorithm. When a laser is incident onto some materials, such as eye tissue, it may propagate underneath the incident surface and scatter in many directions before finally being absorbed or leaving the object. This propagation of the line into tissue causes an effective shift of the maximum peak position of the line intensity. This also results in non-symmetric scattering profiles from biological tissues at non-normal incident angles. The asymmetry of the profile shifts the peak position and may cause a measurement error. However, the position of the leading edge of the reflected beam may not be affected by this shift. Accordingly, for measurements requiring high accuracy, such as those needed for custom scleral lens fitting, the position of the leading edge may be used instead of the peak position. This can be implemented by numerically calculating the first derivative of the peak and selecting the maximum value of the first derivative. In other embodiments, a threshold value may be assigned and the position of the line where this threshold value is crossed is detected. In still further embodiments, other conventional methods of edge detection may be used.

Figure 6:
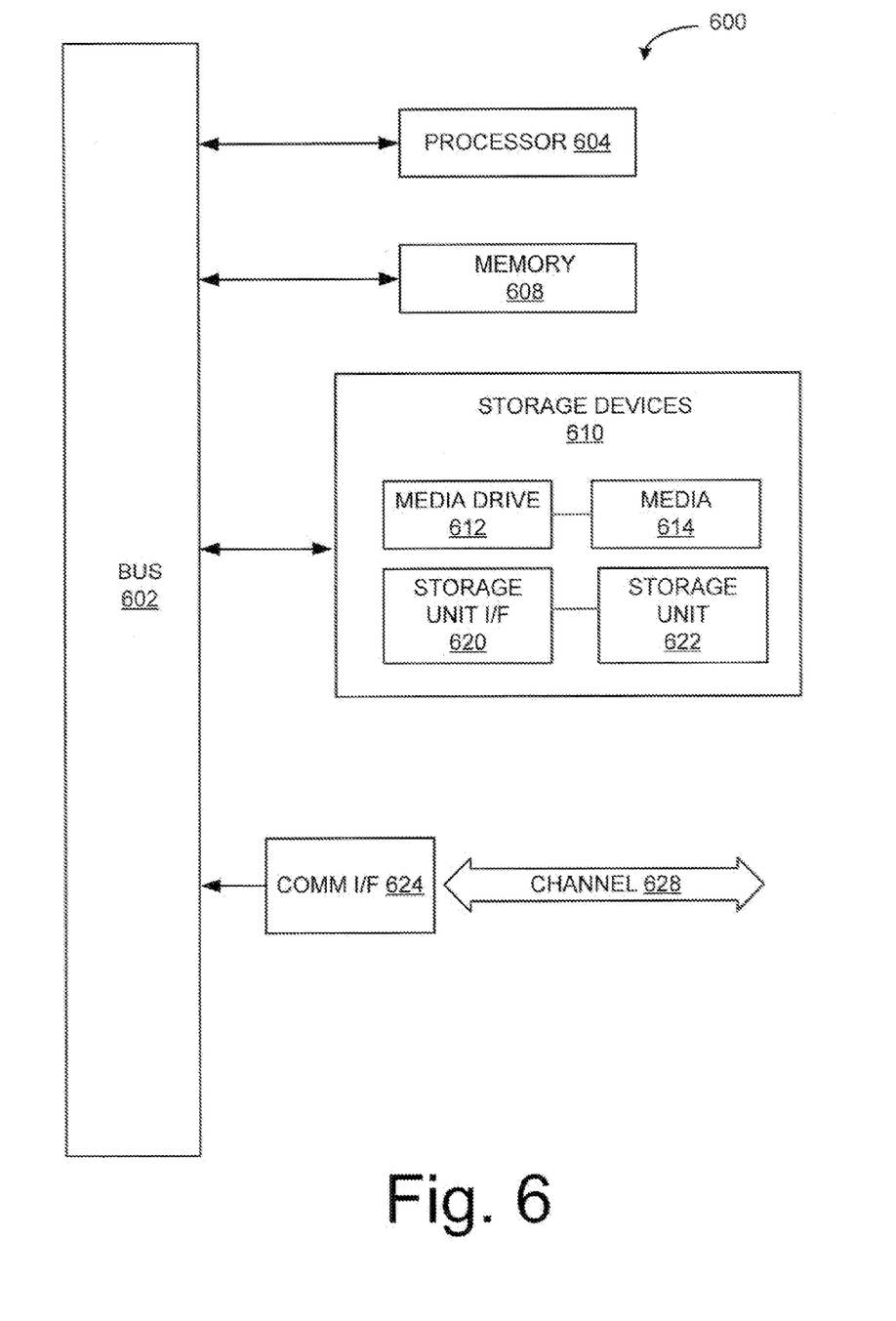
FIG. 6 illustrates an example computing module that may be used in implementing various features of embodiments of the disclosed technology.

As used herein, the term module might describe a given unit of functionality that can be performed in accordance with one or more embodiments of the technology disclosed herein. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the technology are implemented in whole or in part using software, in one embodiment, these software elements can be implemented to operate with a computing or processing module capable of carrying out the functionality described with respect thereto. One such example computing module is shown in FIG. 6. Various embodiments are described in terms of this example-computing module 600. After reading this description, it will become apparent to a person skilled in the relevant art how to implement the technology using other computing modules or architectures.

Referring now to FIG. 6, computing module 600 may represent, for example, computing or processing capabilities found within desktop, laptop and notebook computers; handheld computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 600 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 600 might include, for example, one or more processors, controllers, control modules, or other processing devices, such as a processor 604. Processor 604 might be implemented using a general-purpose or special-purpose processing engine such as, for example, a microprocessor, controller, or other control logic. In the illustrated example, processor 604 is connected to a bus 602, although any communication medium can be used to facilitate interaction with other components of computing module 600 or to communicate externally.

Computing module 600 might also include one or more memory modules, simply referred to herein as main memory 608. For example, preferably random access memory (RAM) or other dynamic memory, might be used for storing information and instructions to be executed by processor 604. Main memory 608 might also be used for storing temporary variables or other intermediate information during execution of instructions to be executed by processor 604. Computing module 600 might likewise include a read only memory ("ROM") or other static storage device coupled to bus 602 for storing static information and instructions for processor 604.

The computing module 600 might also include one or more various forms of information storage mechanism 610, which might include, for example, a media drive 612 and a storage unit interface 620. The media drive 612 might include a drive or other mechanism to support fixed or removable storage media 614. For example, a hard disk drive, a floppy disk drive, a magnetic tape drive, an optical disk drive, a CD or DVD drive (R or RW), or other removable or fixed media drive might be provided. Accordingly, storage media 614 might include, for example, a hard disk, a floppy disk, magnetic tape, cartridge, optical disk, a CD or DVD, or other fixed or removable medium that is read by, written to or accessed by media drive 612. As these examples illustrate, the storage media 614 can include a computer usable storage medium having stored therein computer software or data.

In alternative embodiments, information storage mechanism 610 might include other similar instrumentalities for allowing computer programs or other instructions or data to be loaded into computing module 600. Such instrumentalities might include, for example, a fixed or removable storage unit 622 and an interface 620. Examples of such storage units 622 and interfaces 620 can include a program cartridge and cartridge interface, a removable memory (for example, a flash memory or other removable memory module) and memory slot, a PCMCIA slot and card, and other fixed or removable storage units 622 and interfaces 620 that allow software and data to be transferred from the storage unit 622 to computing module 600.

Computing module 600 might also include a communications interface 624. Communications interface 624 might be used to allow software and data to be transferred between computing module 600 and external devices. Examples of communications interface 624 might include modem or soft-modem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 624 might typically be carried on signals, which can be electronic, electromagnetic (which includes optical) or other signals capable of being exchanged by a given communications interface 624. These signals might be provided to communications interface 624 via a channel 628. This channel 628 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 608, storage unit 620, media 614, and channel 628. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 600 to perform features or functions of the disclosed technology as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A profilometer, comprising:
   a laser light emitter;
   a scanner configured to direct a laser beam emitted by the laser light emitter;
   a camera aligned with the scanner to detect light reflected by an object;
   a processor coupled to the camera and scanner; and
   a non-transitory computer-readable medium operatively coupled to the processor and having instructions stored thereon that, when executed by the processor, cause the processor to determine a three dimensional profile of the object using a camera output by:
   causing the scanner to project a line onto the object;
   determining a position of a leading edge of the reflected laser light by numerically calculating a first derivative of a peak of the reflected light and selecting a maximum value of the first derivative; and
   using the determined position of the leading edge to determine the three dimensional profile of the object.

2. The profilometer of claim 1, wherein the scanner comprises a linear translation stage coupled to the laser light emitter.

3. The profilometer of claim 1, wherein the scanner comprises a rotating mirror or prism.

4. The profilometer of claim 3, wherein the rotating mirror or prism is coupled to a galvanometer.

5. The profilometer of claim 1, wherein the scanner comprises a digital micromirror device.

6. The profilometer of claim 5, wherein the processor is coupled to the digital micromirror device and configured to cause the digital micromirror device to project a line onto the object.

7. The profilometer of claim 6, wherein the processor is configured to cause the digital micromirror to selectively project a plurality of patterns onto the object to provide a corresponding plurality of profilometry modes.

8. The profilometer of claim 5, wherein the processor is coupled to the digital micromirror device and configured to cause the digital micromirror device to project a plurality of lines onto the object.

9. The profilometer of claim 8, wherein the plurality of lines comprises a cross.

10. The profilometer of claim 8, wherein the plurality of lines are different colors.

11. The profilometer of claim 1, further comprising a transmitter coupled to the processor.

12. The profilometer of claim 11, wherein the transmitter is a wireless transmitter.

13. A method, comprising:
    emitting a laser beam;
    directing the laser beam onto an object using a scanner;
    detecting light reflected from the object to produce a series of two-dimensional images;
    determining a position of a leading edge of the reflected laser light by numerically calculating a first derivative of a peak of the reflected light and selecting a maximum value of the first derivative; and
    using the images and the determined position to determine a three-dimensional profile of the object.

14. The method of claim 13, wherein the step of directing the laser beam comprises linearly translating a laser light beam emitter.

15. The method of claim 13, wherein the step of directing the laser beam comprises changing an angle of the laser beam.

16. The method of claim 15, wherein the step of changing the angle of the laser beam comprises rotating a mirror or prism.

17. The method of claim 13, wherein the step of emitting the laser beam comprises projecting a patterned beam using a digital micromirror device.

18. The method of claim 17, wherein the pattern comprises a line.

19. The method of claim 17, wherein the pattern comprises a plurality of lines.

20. The method of claim 17, wherein the pattern is selected from a plurality of patterns corresponding to a plurality of profilometry modes.

* * * * *